United States Patent [19]
Ogawa

[11] Patent Number: 5,312,129
[45] Date of Patent: May 17, 1994

[54] CONNECTION STRUCTURE FOR AIR BAG COVER AND HOUSING

[75] Inventor: Eiji Ogawa, Fujisawa, Japan

[73] Assignee: NSK Ltd., Japan

[21] Appl. No.: 857,432

[22] Filed: Mar. 25, 1992

[30] Foreign Application Priority Data

Mar. 28, 1991 [JP] Japan .................. 3-026518[U]

[51] Int. Cl.⁵ .......................................... B60R 21/16
[52] U.S. Cl. ............................................ 280/728 A
[58] Field of Search .............. 280/728, 731, 732, 743, 280/728 R, 728 A, 728 B; 403/341, 345

[56] References Cited

U.S. PATENT DOCUMENTS

| | | | |
|---|---|---|---|
| 3,819,205 | 6/1974 | Dunford et al. | 280/731 |
| 3,880,447 | 4/1975 | Thorn et al. | |
| 4,148,503 | 4/1979 | Shiratori et al. | 280/731 |
| 4,842,299 | 6/1989 | Okamura et al. | 280/732 |
| 4,903,986 | 2/1990 | Cok et al. | 280/743 |
| 4,989,897 | 2/1991 | Takada | 280/743 |
| 5,167,427 | 12/1992 | Baba | 280/728 |

*Primary Examiner*—Margaret A. Focarino
*Assistant Examiner*—Paul Dickson
*Attorney, Agent, or Firm*—Wegner, Cantor, Mueller & Player

[57] ABSTRACT

A connection structure is provided for an air bag cover and a housing. The air bag cover is fitted on a peripheral wall of said housing. The connection structure includes a protective strip arranged on an outer wall of the air bag cover, a plurality of rivets or the like arranged along an edge portion of an opening of the air bag cover and connecting the housing, the air bag cover and the protective strip, and a plurality of connectors. Each of the connectors comprises a projection and its matching receiving portion. The projection is disposed on or adjacent an imaginary line extending between the longitudinal central axes of each two adjacent ones of the rivets or the like and extends from one of the air bag cover, the housing and the protective strip toward the adjacent one of the remaining two of the air bag cover, the housing and the protective strip. The receiving portion is provided in the adjacent one of the remaining two of the air bag cover, the housing and the protective strip.

12 Claims, 9 Drawing Sheets

CONNECTION STRUCTURE FOR AIR BAG COVER AND HOUSING

BACKGROUND OF THE INVENTION

1) Field of the Invention

This invention relates to an improvement in an air bag system which is mounted on an automotive vehicle or the like and is inflated in the event of a vehicular collision to protect an occupant from impact, and more specifically to a connection structure for an air bag cover and a housing supporting a module thereon and mounted on a vehicle body in an air bag system whereby the strength of connection between the air bag cover and the housing can be enhanced.

2) Description of the Related Art

As a cushioning system for providing additional safety beyond that provided by a seat belt system for holding safely an occupant or the like of an automotive vehicle in a seat, an air bag system has been put into practical use in recent years. With the air bag system, the body of an occupant, especially his head and chest, is supported by a balloon-like air bag in the event of a collision and the internal gas is then gradually discharged, whereby a cushioning stroke is prolonged to reduce impact to the body.

An air bag system of the type mentioned above includes, as is shown in FIG. 14, a module composed of a folded air bag 1, an inflator (gas generator) 2 and the like. The module is accommodated in an air bag cover 3 which can be ruptured open in the event of an emergency. Upon receipt of an electric signal from a sensor which has detected a vehicular collision, the inflator 2 is ignited so that the air bag 1 is instantaneously inflated by the resulting gas. The air bag cover (hereinafter simply called the "cover") 3 has a structure such that, when the air bag system is actuated, the air bag cover is ruptured open by the expanding pressure of the air bag 1 to permit substantial inflation of the air bag 1 through the thus-ruptured opening over the cover 3.

Such an air bag system is mounted on a steering wheel or the like generally through such assembly steps as will be described next. To assemble the air bag system, the air bag 1 is attached to a housing 4 by fastening means such as rivets. The air bag cover 3 is then fitted on the housing 4, whereby the air bag 1 is covered by the air bag cover 3. At this time, while slightly widening a peripheral side wall 3a of the cover 3, hook portions 3b formed at a free edge of the peripheral side wall 3a and bent inwardly of the cover are brought into engagement with a free edge 49 of the housing 4 so that the cover is temporarily secured on the housing. Fastening means 7 such as rivets are then inserted from the outside of the cover through insertion holes into the interior of the housing via protective strips 6. Free end portions of the rivets, said free end portions extending from an inner wall of the housing 4, are subjected to plastic deformation, whereby the cover 3 is firmly secured on the housing 4.

The inflator 2 is thereafter mounted on the housing 4 by an unillustrated mounting means to form a module. The module is then mounted on a steering wheel.

In the air bag system assembled as described above, the hook portions 3b function as temporary securing means as described above. In addition to this function, the hook portions 3b are also provided to withstand opening force applied to the cover upon expansion of the air bag so that the cover 3 is prevented from being separated from the housing 4 by the opening force.

Further, Japanese Patent Application Laid-Open (Kokai) No. HEI 1-109146, which corresponds to U.S. Pat. No. 4,989,897, discloses another air bag cover with projections (3,18,19) instead of the above-mentioned hook portions 3b, said projections extending outwardly from the air bag cover or both outwardly and inwardly from the air bag cover so that the cover 3 is prevented from being separated. As has been described above, the connection between a cover and a housing in conventional art is effected by bringing hook portions, which are provided along an edge portion of an opening of the cover, into engagement with the free end edge of the housing and holding a peripheral side wall of the cover between a protective strip and the housing, whereby the cover is firmly secured on the housing.

In the conventional structures described above, the opening force applied to the cover upon expansion of the air bag is, however, first exerted on the fastening means, such as rivets, inserted through the cover so that high shear load is applied around the rivet-inserted holes and is then transmitted to the hook portions located on a side rear of the fastening means relative to the opening force. Accordingly, the hook portions do not have substantial resistance to the opening force and contribute only after deformation of the rivet-inserted holes. Nevertheless, the formation of the cover is complicated due to the need for the formation of the hook portions having such a little function. Further, the formation of the hook portions has led to an increase in the dimensions of the cover. This is certainly not preferred from the standpoint of external appearance and also where the mounting space for the air bag system is extremely limited. In addition, the temporary securement of the cover is time-consuming where the hook portions are provided along the entire periphery of the edge portion of the opening of the cover.

SUMMARY OF THE INVENTION

With the foregoing in view, the present invention has as its primary object the provision of a connection structure for an air bag cover and a housing, said connection structure being capable of providing large resistance to opening force applied to the cover without the need for any increase in the number of fastening means.

The above object of this invention can be achieved by a connection structure for air bag cover and a housing, said air bag cover being fitted on a peripheral wall of said housing, which comprises:

a plurality of fastening means arranged along an edge portion of an opening of the air bag cover or flap thereof and connecting the housing and the air bag cover;

a plurality of connecting means, each of said connecting means comprising two projections, such as beads or lugs said projections being disposed on or adjacent an imaginary line extending between centers of each two adjacent ones of said fastening means, one of said projections extending from one of the air bag cover and the housing toward the other and the other projection extending from the other one of the air bag cover and the housing toward one of the air bag cover and the housing, and receiving portions provided in the other one of the air bag cover and the housing and in one of the air bag cover and the housing, respectively, so that the projections can be brought into engagement with the corresponding receiving portions.

The above object of this invention can also be achieved by a connection structure for air bag cover and a housing, said air bag cover being fitted on a peripheral wall of said housing, which comprises:

a protective strip arranged on an outer wall of the air bag cover;

a plurality of fastening means arranged along an edge portion of an opening of the air bag cover or flap thereof and connecting the housing, the air bag cover and the protective strip;

a plurality of connecting means, each of said connecting means comprising a protrusion, such as beads or lugs which is disposed on or adjacent an imaginary line extending between centers of each two adjacent ones of said fastening means and extends from one of the air bag cover, the housing and the protective strip toward the adjacent one of the remaining two of the air bag cover, the housing and the protective strip, and a receiving portion provided in the adjacent one of the remaining two of the air bag cover, the housing and the protective strip so that the protrusion can be brought into engagement with the receiving portion.

As the connecting means contributing to the connection between the cover and the housing are disposed on or adjacent an imaginary line extending between centers of each two adjacent ones of the fastening means, shear load applied upon rupture and opening of the cover is distributed to and simultaneously transmitted to the connecting means and the fastening means. As a result, localized concentration of stress can be avoided so that the cover can be protected from breakage and the connection between the cover and the housing can be strengthened.

The above structures can improve the resistance without increasing the number of fastening means. Moreover, it is possible to reduce the opening force exerted on fastening means so that the fastening means such as rivets can be made smaller or fewer. The elimination of hooked portions from the cover can simplify the formation of the cover and, at the same time, can reduce the external dimensions of the cover.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
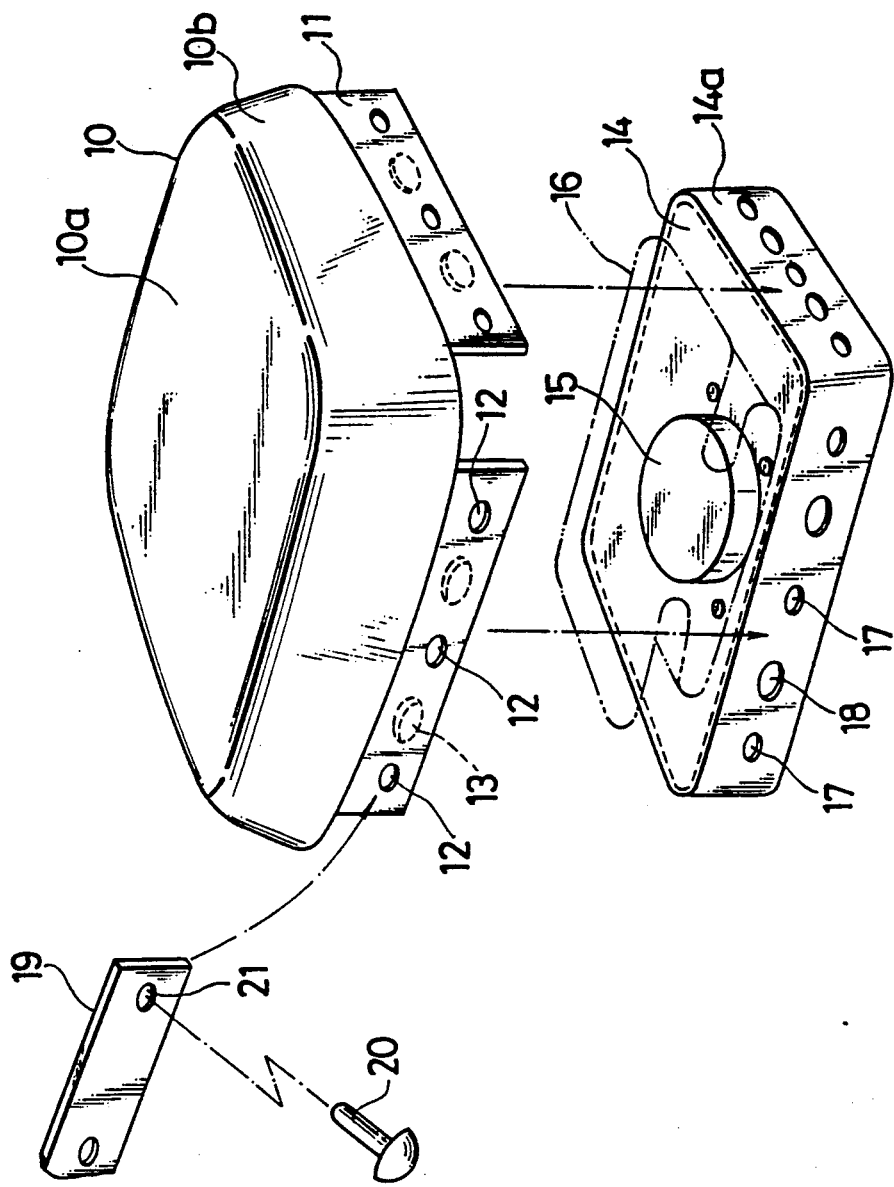
FIG. 1 is an exploded perspective view of a connection structure according to a first embodiment of the present invention for an air bag cover and a housing.

Referring first to FIG. 1, the connection structure according to the first embodiment of the present invention will be described. A cover 10 which also serves as a center pad of a steering wheel has a substantially square top wall 10a, a side wall 10b extending downwardly from the peripheral edge of the top wall and four flaps 11 pendant from the side wall with parts thereof embedded in the side wall, and is formed in a substantially box-like shape. The flaps 11 are provided with a plurality of first through-holes 12 opened at predetermined intervals and beads 13 arranged between the first through-holes and extending toward the interior of the cover. The beads will be described further subsequently.

A housing 14 on which the cover 10 is fitted has a substantially box-like shape opening at a bottom wall thereof. The housing 14 supports an inflator 15 disposed in a central opening and an air bag 16 stored in a folded form, and is fixed on a boss part of the steering wheel. A peripheral wall 14a of the housing 14 is provided with second through-holes 17 opening at positions corresponding to the first through-holes and having a size equal to the first through-holes and also with receiving holes 18 opening at positions corresponding to the beads 13.

The cover 10 is externally fitted on the housing 14 such that the flaps 11 cover the peripheral wall 14a of the housing 14, are held between protective strips 19 applied on outer walls of the flaps 11 and the peripheral wall 14a of the housing 14 and are connected to the housing 14 by plastically-deformed plural rivets 20 as fastening means. Namely, the protective strips 19 are provided with holes 21 formed at positions corresponding to the first through-holes 12 formed in the cover 10 and also to the second through-holes 17 formed in the housing 14 and having a size equal to the first and second through-holes 12,17. The rivets 20 are inserted in these holes 12,17,21 to effect the fastening. The protective strips 19 are riveted together to ensure the prevention of separation of the cover 10 from the rivets 20 and the housing 14 when opening force is applied to the cover 10. As will be described subsequently, the protective strips 19 are not essential.

As already described above, the beads 13 formed on the flaps 11 of the cover 10 extend toward the housing 14 and are fitted in the receiving holes 18, and each connection means composed of each bead 13 and its corresponding receiving hole 18 is provided on an imaginary line extending between the longitudinal central axes of the adjacent rivets 20.

Figure 2A:
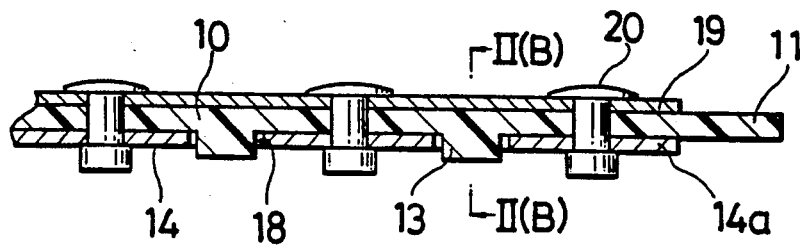
FIG. 2(A) is a fragmentary cross-sectional view of the connection structure of FIG. 1.
Figure 2B:
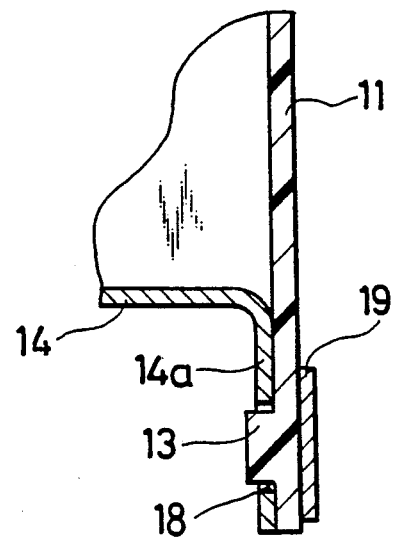
FIG. 2(B) is a fragmentary cross-sectional view of the connection structure, taken in the direction of arrows II(B)—II(B) of FIG. 2(A)

FIGS. 2(A) and 2(B) show an essential part of the above-described first embodiment of the present invention in more detail.

Namely, the flaps 11 of the cover 10 are held between the corresponding protective strips 19 and the peripheral wall 14a of the housing 14 and are connected to them by the plural rivets 20. The beads 13 are provided on the flaps 11 at positions between the rivets 20 and are fitted in the respective receiving holes 18 formed on the imaginary lines extending between the longitudinal central axes of the adjacent rivets 20. It is preferable to chamfer the free ends of the beads 13 or to form the free ends round so as to use them as guides upon assembly.

When the cover 10 is subjected to opening force and is caused to burst upon expansion of the air bag in the event of an emergency, the cover 10 is drawn in the direction that the cover 10 will be pulled off from the housing 14. When the connection structure is constructed as described above, the fastening means composed of the rivets 20 and the connection means composed of the projections 13 and the receiving holes 18 are arranged on the same line relative to the opening force. The opening force can therefore be distributed evenly at the same time, whereby localized concentration of shear load can be avoided to ensure strong connection between the cover and the housing.

The rivets were used as fastening means in the embodiment described above. Needless to say, means other than rivets, for example, bolts and nuts can also be used in the present invention.

In the embodiment described above, only one connecting means composed of each bead 13 and its associated receiving hole 18 was arranged between each two adjacent fastening means. It is, however, to be noted that plural fastening means can be arranged in view of the number or size of the fastening means. Further, each connecting means can be provided adjacent an imaginary line extending between the longitudinal central axes of each two adjacent rivets 20.

Figure 3A:
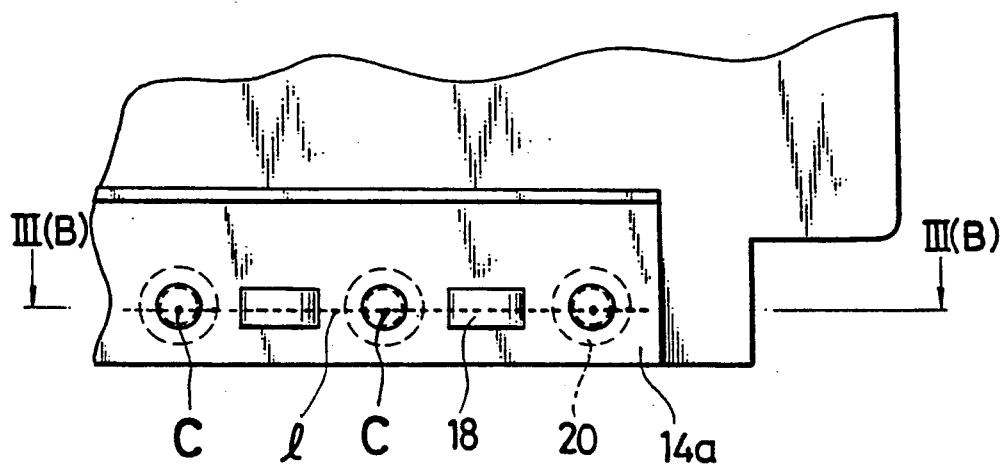
FIG. 3(A) is a fragmentary plan view of a connection structure according to a second embodiment of the present invention.
Figure 3B:
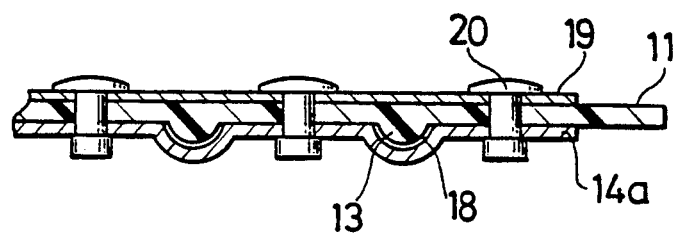
FIG. 3(B) is a fragmentary cross-sectional view of the connection structure according to the second embodiment, taken in the direction of arrows III(B)—III(B) of FIG. 3(A)

The second embodiment of the present invention will next be described with reference of FIG. 3(A) and FIG. 3(B). In the second embodiment, each flap 11 of the cover 10 held between the peripheral wall 14a of the housing 14 and the corresponding protective strip 19 has beads 13 extending toward the peripheral wall 14a of the housing 14. Receiving portions 18 are provided in the form of recesses in the peripheral wall 14a, in which the beads 13 are fitted. Each receiving portion 18 is located on an imaginary line extending between the longitudinal central axes of the adjacent rivets 20, that is, as viewed in the plan view of FIG. 3(A), on a dotted line 1 extending through the centers C of the adjacent rivets 20.

Figure 4:
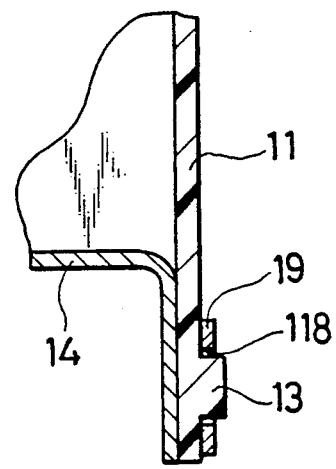
FIG. 4 is a fragmentary cross-sectional view of a connection structure according to a third embodiment of the present invention.

The third embodiment of this invention will now be described with reference to FIG. 4. Similarly to the first embodiment described above, each flap 11 of the cover 10 is held between the housing 14 and the corresponding protective strip 19 and is connected thereto by rivets (not shown). Further, beads 13 are formed on the flap 11 of the cover 10 and extend toward the protective strip 19 applied on the outer wall of the cover. Receiving holes 118 are formed in the protective strip 19, in which the beads 13 are fitted, respectively. Fastening means composed of each bead 13 and its corresponding receiving hole 118 is provided on or adjacent an imaginary line extending between the longitudinal central axes of the two adjacent rivets.

Figure 5:
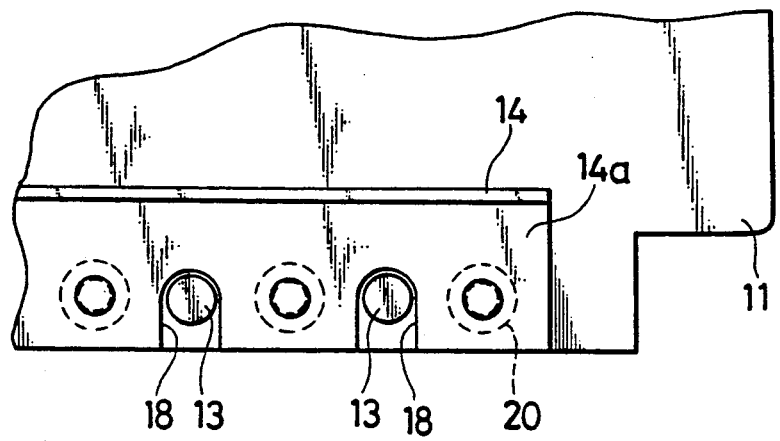
FIG. 5 is a fragmentary rear view of a connection structure according to a fourth embodiment of the present invention.

Reference is next had to FIG. 5 which illustrates the fourth embodiment of this invention. This figure is a fragmentary rear view as seen from the inside of the cover. Each flap 11 of the cover 10 is held between the peripheral wall 14a of the housing 14 and the unillustrated corresponding protective strip and is provided with beads 13 extending toward the peripheral wall 14a of the housing 14. In the peripheral wall 14a of the housing 14, receiving portions 18 in the form of notches are formed with the corresponding beads 13 received therein. Formation of the receiving portions 18 in such a notch-like shape can facilitate the temporary securement of the cover on the housing upon assembly.

Figure 6A:
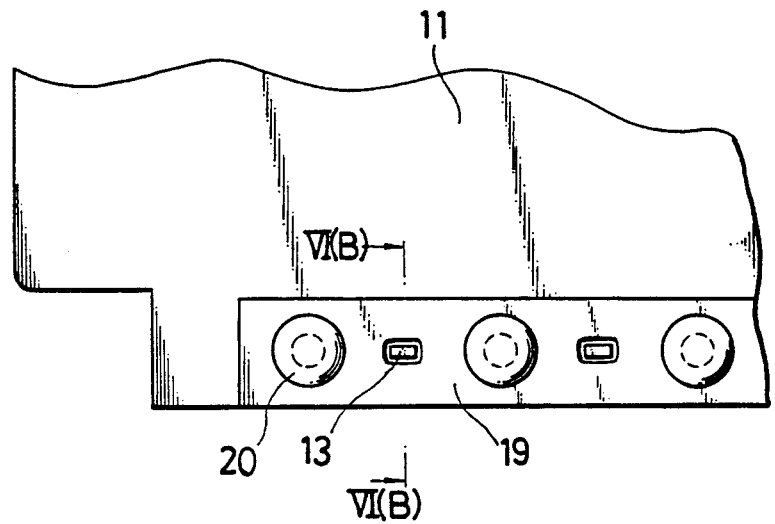
FIG. 6(A) is a fragmentary plan view of a connection structure according to a fifth embodiment of the present invention.
Figure 6B:
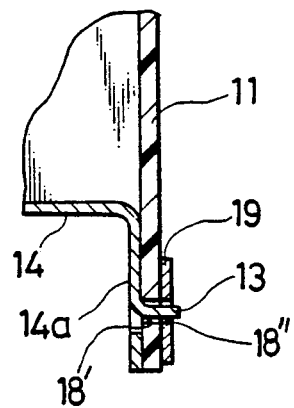
FIG. 6(B) is a fragmentary cross-sectional view of the connection structure according to the fifth embodiment, taken in the direction of arrows VI(B)—VI(B) of FIG. 6(A)

The fifth embodiment according to the present invention will now be described with reference to FIGS. 6(A) and 6(B). In this embodiment, each flap 11 of the cover 10 is also held between the housing 14 and its corresponding protective strip 19. The peripheral wall 14a of the housing 14 is partly cut and bent into lugs 13. These lugs 13 extend toward the flap 11 of the cover 10 and the corresponding protective strip 19. Receiving holes 18',18" in which the lugs 13 are fitted are formed in the flap 11 of the cover 10 and also in the protective strip 19. A connecting means is formed by each lug 13 and its corresponding receiving holes 18',18". Similarly to the above embodiments, the connecting means is arranged on an imaginary line extending between the longitudinal central axes of the two adjacent rivets.

Figure 7A:
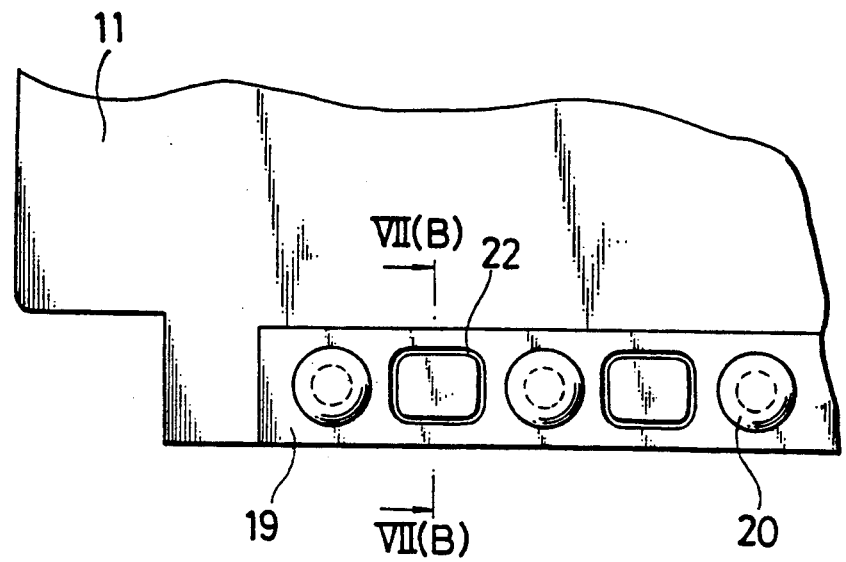
FIG. 7(A) is a fragmentary plan view of a connection structure according to a sixth embodiment of the present invention.
Figure 7B:
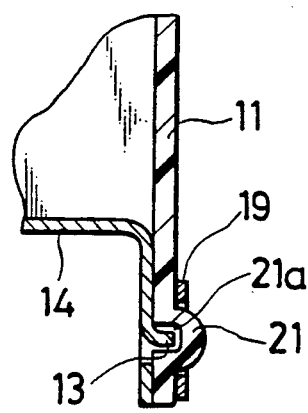
FIG. 7(B) is a fragmentary cross-sectional view of the connection structure according to the sixth embodiment, taken in the direction of arrows VII(B)—VII(B) of FIG. 7(A)

The sixth embodiment according to the present invention are illustrated in FIGS. 7(A) and 7(B). Like the embodiment shown in FIGS. 6(A) and 6(B), lugs 13 are formed in a shape similar to that of the lugs 13 in FIGS. 6(A) and 6(B) on the peripheral wall 14a of the housing. Each flap 11 of the cover 10 has protrusions 21 having a receiving recess 21a, in which the corresponding lug 13 is fitted, and extending toward the corresponding protective strip 19. Formed through the protective strip 19 are holes 22 as receiving holes, in which the corresponding protrusions 21 are fitted.

Figure 8:
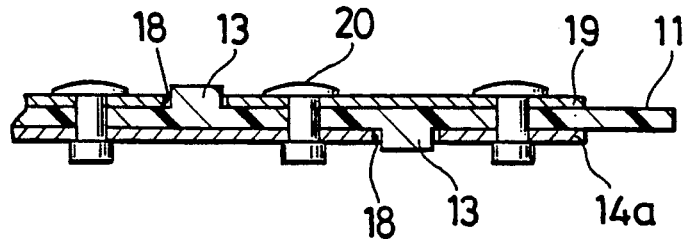
FIG. 8 is a fragmentary cross-sectional view of a connection structure according to a seventh embodiment of the present invention.

Referring next to FIG. 8, the seventh embodiment of the present invention will be described. Each flap 11 of the cover 10 has plural beads which alternately extend toward the corresponding protective strip 19 and the housing 14. Receiving holes 18 are formed in the protective strip 19 and the peripheral wall 14a of the housing 14, in which the beads 13 are fitted. The flap 11 of the cover 10 is held between the protective strip 19 and the peripheral wall 14a of the housing 14.

Figure 9:
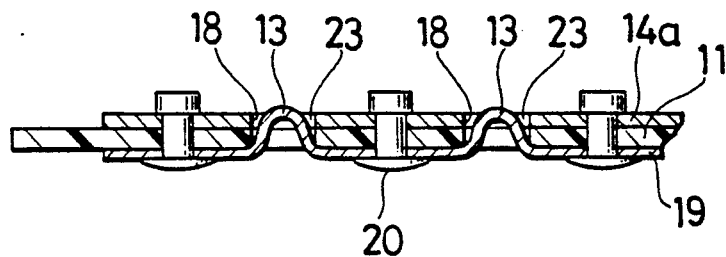
FIG. 9 is a fragmentary cross-sectional view of a connection structure according to an eighth embodiment of the present invention.

Reference is next had to FIG. 9, in which the eighth embodiment according to the present invention is illustrated. Raised portions 13 are formed on each protective strip 19 and extend toward the corresponding flap 11 of the cover 10 and the peripheral wall 14a of the housing 14. Receiving holes in which the raised portions 13 are fitted are formed as receiving holes 18 in the protective strip 19 and also as receiving holes 23 in the peripheral wall 14a of the housing 14.

Figure 10:
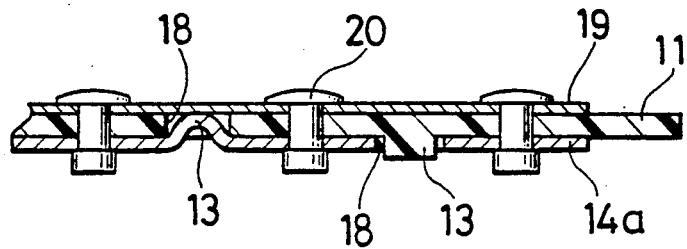
FIG. 10 is a fragmentary cross-sectional view of a connection structure according to a ninth embodiment of the present invention.

The ninth embodiment of the present invention will now be described with reference to FIG. 10. Each flap 11 of the cover 10 is held between the corresponding protective strip 19 and the peripheral wall 14a of the housing 14. Raised portions 13 are formed on the flap 11 of the cover 10 and beads 13 are formed on the peripheral wall 14a of the housing 14. The raised portions 13 provided on the flap 11 of the cover 10 extend toward the housing 14 and are fitted in receiving holes 18 formed in the housing 14. On the other hand, the beads 13 formed on the housing 14 extend toward the flap 11 of the cover 10 and are fitted in receiving holes 18 formed in the flap 11 of the cover 10.

In each the embodiments described above, the protective strips are provided and the flaps of the cover are held between the corresponding protective strips and the housing. It is however to be noted that the present invention can also be practiced without such protective strips. Even in such a case, the connection between the cover and the housing can still be achieved without reducing the resistance to force applied thereto.

Figure 11A:
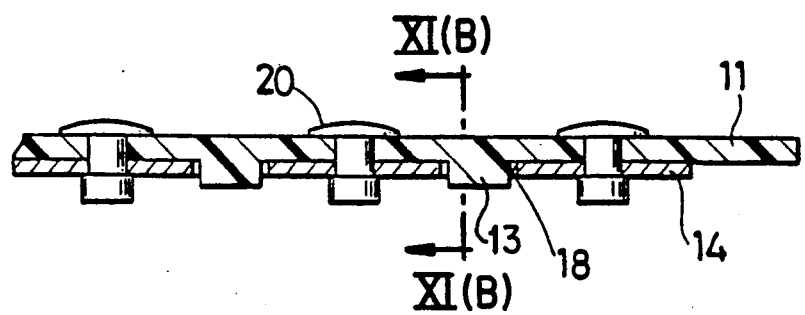
FIG. 11(A) is a fragmentary plan view of a connection structure according to a tenth embodiment of the present invention.
Figure 11B:
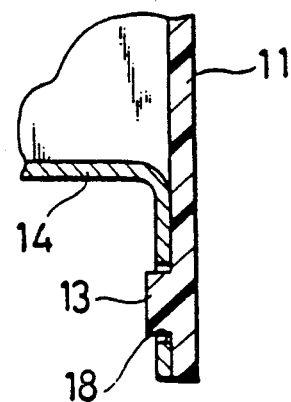
FIG. 11(B) is a fragmentary cross-sectional view of the connection structure according to the tenth embodiment, taken in the direction of arrows XI(B)—XI(B) of FIG. 11(A)

FIGS. 11(A) and 11(B) show one example of such a construction as the tenth embodiment of the present invention. Beads 13 are provided on a flap 11 of the cover 10 and extend toward the peripheral wall 14a of the housing 14. On the other hand, receiving holes 18 in which the beads 13 are fitted, respectively, are formed in the peripheral wall 149 of the housing 14.

The second and ninth embodiments can also be practiced without the protective strips as in the tenth embodiment described above.

Figure 12:
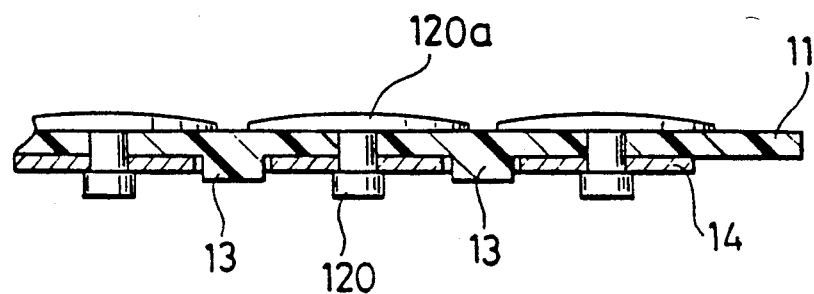
FIG. 12 is a fragmentary plan view of a connection structure according to an eleventh embodiment of the present invention.
Figure 13A:
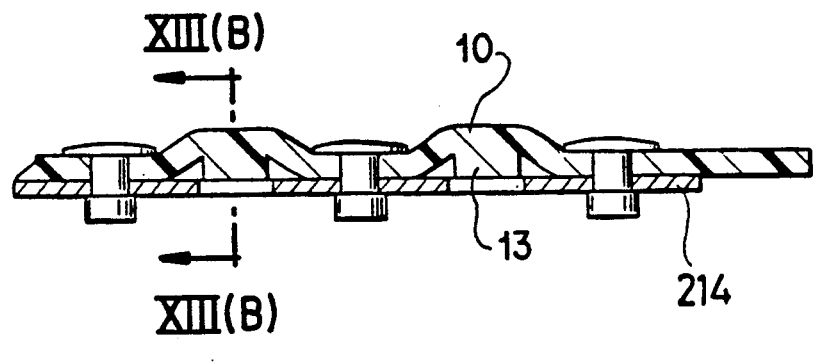
FIG. 13(A) is a fragmentary plan view of an undesirable connection structure.
Figure 13B:
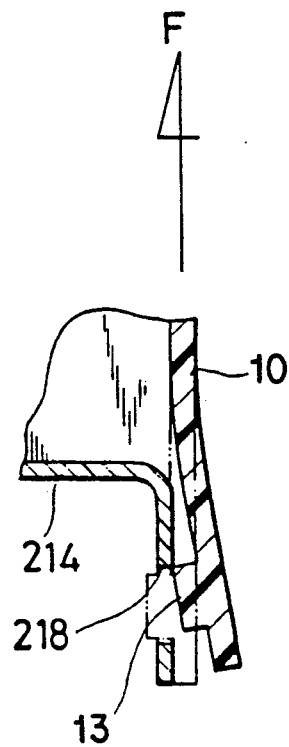
FIG. 13(B) is a cross-sectional vie of the undesirable connection structure, taken in the direction of arrows XIII(B)—XIII(B) of FIG. 13(A)
Figure 14:
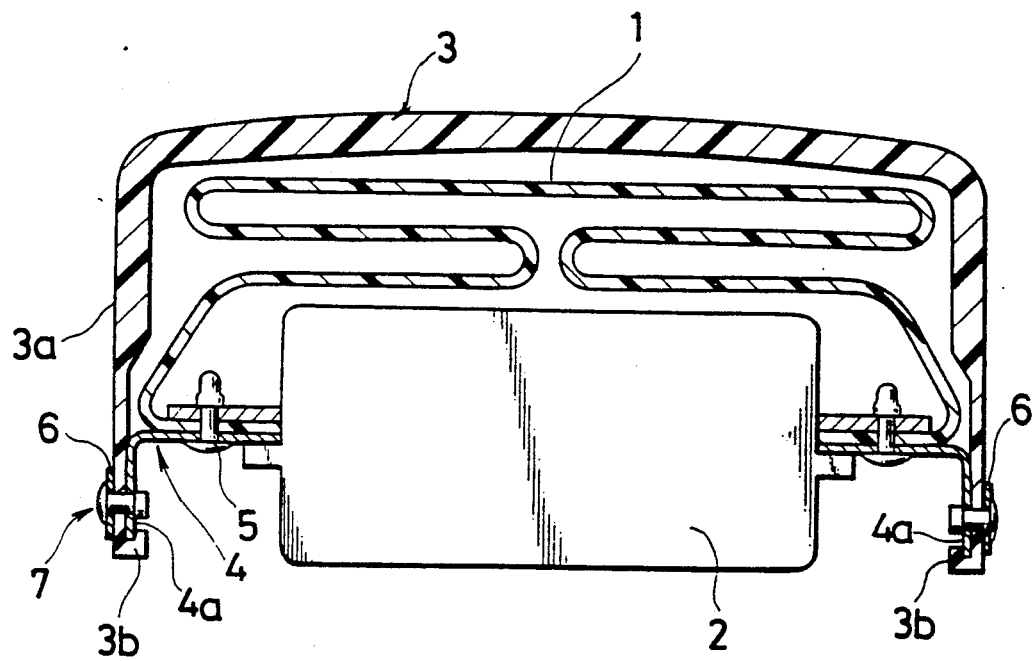
FIG. 14 is a cross-sectional view of a conventional connection structure for an air bag cover and a housing.

FIG. 12 illustrates the eleventh embodiment of the present invention, while FIGS. 13(A) and 13(B) show an undesired state in an exaggerated form. In FIG. 12, each rivet 120 as fastening means has a large flange 120a. This flange 120a partly overlaps with adjacent protrusions 13 which extend from the flap 11 of the cover 10 toward the housing 14. Owing to this construction, it is possible to avoid the problem that, as illustrated in FIGS. 13(A) and 13(B), force is applied to the cover 10 in the direction F upon expansion of the air bag and the protrusion 13 is caused to flex in a direction to be pulled out.

It is to be noted that the present invention can be practiced by suitably combining the structures of two or more of the embodiments described above.

I claim:

1. A connection structure for an air bag cover and a housing, said bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from one of the air bag cover, the housing and the protective strip toward the adjacent one of the remaining two of the air bag cover, the housing and the protective strip, and a receiving portion provided in the adjacent one of the remaining two of the air bag cover, the housing and the protective strip so that the projection can be brought into engagement with the receiving portion.

2. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from one of the air bag cover and the housing toward the other, and a receiving portion provided in the other one of the air bag cover and the housing so that the projection can be brought into engagement with the receiving portion.

3. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from one of the air bag cover and the protective strip toward the other, and a receiving portion provided in the other one of the air bag cover and the protective strip so that the projection can be brought into engagement with the receiving portion.

4. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting comprising a projection, which is disposed substantially on imaginary line extending between centers of each two adjacent ones of said fastening means and extends from one of the air bag cover, the housing and the protective strip toward the remaining two of the air bag cover, the housing and the protective strip, and a receiving portion provided in the remaining two of the air bag cover, the housing and the protective strip so that the projection can be brought into engagement with the receiving portion.

5. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from the housing toward the air bag cover and the protective strip, and receiving portions provided in the air bag cover and the protective strip, respectively, so that the projection can be brought into engagement with the receiving portions.

6. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing the air bag cover and the protective strip;

a plurality of connecting means, each of said connecting means comprising a projection, which is disposed substantially on an imaginary line extending between centers of each two adjacent ones of said fastening means and extends from the air bag cover toward the housing and the protective strip, and receiving portions provided in the housing and the protective strip, respectively, so that the projection can be brought into engagement with the receiving portions.

7. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from the protective strip toward the air bag cover and the housing, and receiving portions provided in the air bag cover and the housing, respectively, so that the projection can be brought into engagement with the receiving portions.

8. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing, the air bag cover and the protective strip thereby connecting the housing, the air bag cover and the protective strip;

a plurality of connecting means, each of said connecting means comprising a projection, which is disposed substantially on an imaginary line extending between centers of each two adjacent ones of said fastening means and extends from one of the housing and the protective strip toward the air bag cover, a protrusion disposed on the air bag cover, receiving the projection therein and extending toward the other one of the housing and the protective strip, and a receiving portion provided in the other one of the housing and the protecting strip so that the protrusion can be brought into engagement with the receiving portion.

9. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending therethrough the housing, the air bag cover and the protective strip thereby connecting the housing, the air bag cover and the protective strip;

a plurality of connecting means, each of said connecting means comprising projections, said projections being disposed substantially on an imaginary line extending between centers of each two adjacent ones of said fastening means, and one of said projections extending from one of the air bag cover, the housing and the protective strip toward one of the housing and the protective strip, and the other projection extending from one of the remaining two of the air bag cover, the housing and the protective strip toward the one of the air bag cover, the housing and the protective strip, and receiving portions provided in the adjacent one of the remaining two of the air bag cover, the housing and the protective strip and the one of the air bag cover, the housing and the protective strip so that the projections can be brought into engagement with the corresponding receiving portions.

10. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing and the air bag cover thereby connecting the housing and the air bag cover;

a plurality of connecting means, each of said connecting means comprising a projection, which is disposed substantially on an imaginary line extending between centers of each two adjacent ones of said fastening means and extends from one of the housing and the air bag cover toward the other, and a receiving portion provided in the other one of the housing and the air bag cover so that the projection can be brought into engagement with the receiving portion.

11. The connection structure of claim 10, wherein first through-holes are formed in the housing, second through-holes are formed in the air bag cover, the fastening means are rivets inserted in the corresponding first and second through-holes and having a head portion, and the head portion partly overlaps with the adjacent projections.

12. A connection structure for an air bag cover and a housing, said air bag cover being fitted on a peripheral wall of said housing, comprising:

a protective strip arranged on an outer wall of the air bag cover;

a plurality of fastening means arranged along an edge portion of an opening of the air bag cover and extending through the housing and the air bag cover thereby connecting the housing and the air bag cover;

a plurality of connecting means, each of said connecting means comprising two protrusions, said protrusions being disposed substantially on an imaginary line extending between centers of each two adjacent ones of said fastening means, one of said protrusions extending from one of the air bag cover and the housing toward the other and the other protrusion extending from the other one of the air bag cover and the housing toward one of the air bag cover and the housing, and receiving portions provided in the other one of the air bag cover and the housing and in one of the air bag cover and the housing, respectively, so that the protrusions can be brought into engagement with the corresponding receiving portions.

* * * * *